H. A. HUNT.
GASKET CUTTER.
APPLICATION FILED APR. 1, 1916.
1,246,925.
Patented Nov. 20, 1917.
Fig. 1.
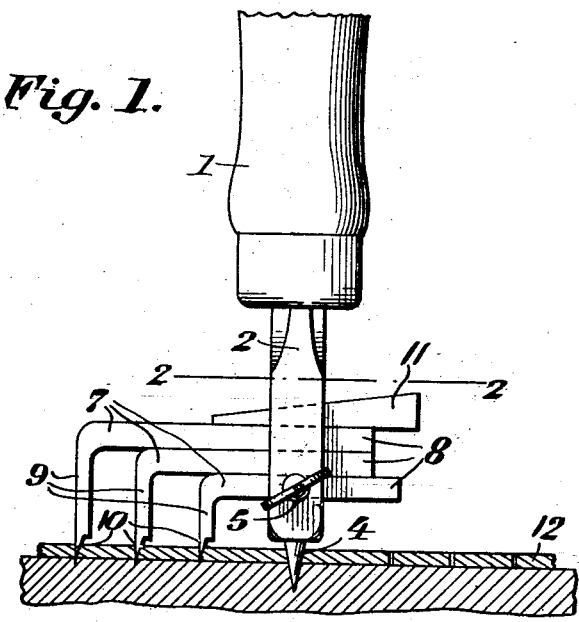
Fig. 3.
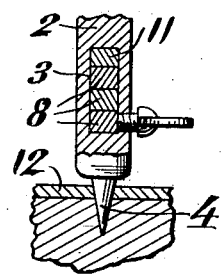
Fig. 2.
WITNESSES
INVENTOR
Hervey A. Hunt
BY
Richard B. Owen.
ATTORNEY

UNITED STATES PATENT OFFICE.

HERVEY A. HUNT, OF MOHAWK, NEW YORK.

GASKET-CUTTER.

1,246,925.

Specification of Letters Patent.

Patented Nov. 20, 1917.

Application filed April 1, 1916. Serial No. 88,336.

*To all whom it may concern:*

Be it known that I, HERVEY A. HUNT, a citizen of the United States, residing at Mohawk, in the county of Herkimer and State of New York, have invented certain new and useful Improvements in Gasket-Cutters, of which the following is a specification.

This invention has relation to gasket cutters, and the nature and objects thereof will be readily apparent to those skilled in the art to which it appertains, in the light of the following explanation of the accompanying drawings, illustrating what I now believe to be the preferred embodiment, or mechanical expression, of my invention from among other forms and arrangements within the spirit thereof, and the scope of the appended claims.

However, an object of the invention is to provide a gasket cutter having a plurality of cutters arranged so that a plurality of gaskets of various diameters may be simultaneously cut from a blank of material, the said cutters being relatively adjustable so that the relative diameters of the gaskets to be cut after each operation may be changed, and means for securing the cutters against displacement subsequent to adjustment.

In addition to the foregoing my invention comprehends improvements in the details of construction and arrangement of parts, to be hereinafter described and particularly pointed out in the appended claims.

In the accompanying drawings in which similar and corresponding parts are designated by the same characters of reference throughout the several views in which they appear;

Figure 1, is a view in side elevation of a gasket cutter constructed in accordance with my invention.

Fig. 2, is a horizontal section on the line 2—2 of Fig. 1.

Fig. 3, is a vertical section on the line 3—3 of Fig. 2.

With reference to the drawings 1 indicates a handle provided with a shank 2, which shank is transversely slotted at 3. The outer end of the shank is pointed as at 4 and a threaded aperture is provided in the shank to extend at right angles to the slot 4, and to intersect said slot at its end adjacent the point 4. A threaded member 5 provided with a winged head 6 is engaged into the threaded opening, and is adapted to secure the lowermost, and innermost cutter, of a plurality of cutters designated 7.

The cutters are formed with shanks 8 for reception in the slot of the shank 2, and are adapted to extend at right-angles to said shank. The cutters are formed with right-angular portions 9 on the terminals of the shanks and are provided with cutting edges 10 disposed in radial alinement with the point 4 as the center. A wedge 11 is adapted to be inserted in the slot 3, so as to fill that portion of the slot unoccupied by the shanks of the cutters, and to securely bind said shanks together against relative displacement.

In operation, the blank of material 12 is transfixed centrally by the pointed member 4, the cutters having been previously adjusted so that the cutting edges 10 occupy the proper radial location from the point 4 to ultimately cut gaskets of the required dimensions. After the cutters are properly adjusted, the shank of the innermost one is independently held by turning up the threaded member 5, the remaining cutters are then secured against displacement by driving in the wedge 11. The cutters being properly adjusted the handle 1 is rotated and the cutting edges 10, will describe circular paths, cutting through the material of the blank, and thereby forming the gaskets.

Thus it will be seen I have provided a novel and simple gasket cutter, capable of cutting nested gaskets of different diameters within the limits of the tool. Various ways of constructing my invention will occur to those skilled in the art, and I therefore reserve the right and privilege of changing the form of the details, or otherwise altering the arrangement of the parts without departing from the spirit of the invention or the scope of the appended claim.

Having thus described my invention what I claim as new and desire to secure by Letters Patent is:—

A gasket cutter including a pointed center shank having a transverse opening, a plurality of cutters having shanks in superposed relation and in contact and all of said shanks inserted in the openings for radial adjustment relative to the center shank, a set screw mounted in the center shank for engaging the lowermost cutter shank to retain the cutter thereof in position subsequent to adjustment, and a wedge driven in the transverse opening to secure the shanks of the remaining cutters by frictional engagement against each other, and the lowermost shank, in their relative adjusted position, whereby the lowermost cutter may be permanently set, and the remaining cutters adjusted toward and away from each other and relative to the lowermost cutter.

In testimony whereof I affix my signature in presence of two witnesses.

HERVEY A. HUNT.

Witnesses:
FRED DARVEAM,
CHAS. B. REYNOLDS.

Copies of this patent may be obtained for five cents each, by addressing the "Commissioner of Patents, Washington, D. C."